United States Patent
Oh et al.

(10) Patent No.: US 10,749,155 B2
(45) Date of Patent: Aug. 18, 2020

(54) PACKAGING OF BARE CELL STACKS WITHIN DEVICE ENCLOSURES FOR PORTABLE ELECTRONIC DEVICES

(71) Applicant: Apple Inc., Cupertino, CA (US)

(72) Inventors: Bookeun Oh, Fremont, CA (US); Richard M. Mank, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 100 days.

(21) Appl. No.: 15/155,280

(22) Filed: May 16, 2016

(65) Prior Publication Data

US 2016/0336562 A1 Nov. 17, 2016

Related U.S. Application Data

(60) Provisional application No. 62/161,817, filed on May 14, 2015.

(51) Int. Cl.
| | |
|---|---|
| *H01M 2/10* | (2006.01) |
| *H01M 2/08* | (2006.01) |
| *H01M 2/02* | (2006.01) |
| *H01M 10/04* | (2006.01) |
| *H01M 2/06* | (2006.01) |

(52) U.S. Cl.
CPC ....... *H01M 2/1066* (2013.01); *H01M 2/0275* (2013.01); *H01M 2/0285* (2013.01); *H01M 2/08* (2013.01); *H01M 2/06* (2013.01); *H01M 10/049* (2013.01); *H01M 2220/30* (2013.01)

(58) Field of Classification Search
None
See application file for complete search history.

(56) References Cited

U.S. PATENT DOCUMENTS

| | | | |
|---|---|---|---|
| 1,862,181 A * | 6/1932 | Emmons | A47J 43/06 366/197 |
| 2,333,028 A | 10/1943 | Merrill | |
| 4,607,207 A | 8/1986 | Bruneau | |
| 5,015,546 A | 5/1991 | Dulaney et al. | |
| 5,741,609 A * | 4/1998 | Chen | H01M 2/1673 29/623.4 |
| 5,769,874 A * | 6/1998 | Dahlberg | A61N 1/375 607/36 |
| 5,814,091 A * | 9/1998 | Dahlberg | A61N 1/375 607/36 |
| 6,002,583 A | 12/1999 | Shoji | |

(Continued)

FOREIGN PATENT DOCUMENTS

| | | |
|---|---|---|
| CN | 1283312 | 2/2001 |
| CN | 100555710 | 10/2009 |

(Continued)

OTHER PUBLICATIONS

"The Evolution of Oilfield Batteries," Hensley et al., Oilfield Review, Autumn 1998, p. 42-57, retrieved online on 07/15/20414 from: https://www.slb.com/~/media/Files/resources/oilfield_review/ors98/aut98/evolution.pdf.

*Primary Examiner* — Maria Laios
(74) *Attorney, Agent, or Firm* — Polsinelli PC

(57) ABSTRACT

A battery cell compartment is formed with the device enclosure of an electronic device. Bare cell stacks are placed within the cell compartment. The resulting battery powers the electronic device.

11 Claims, 7 Drawing Sheets

(56) References Cited

U.S. PATENT DOCUMENTS

| | | | |
|---|---|---|---|
| 6,238,813 B1* | 5/2001 | Maile | A61N 1/378 |
| | | | 429/176 |
| 6,451,483 B1* | 9/2002 | Probst | H01M 4/043 |
| | | | 29/623.1 |
| 6,636,018 B2 | 10/2003 | Hirota | |
| 6,851,828 B1 | 2/2005 | Hansen | |
| 7,285,334 B1* | 10/2007 | Yamashita | H01M 2/0267 |
| | | | 428/220 |
| 7,479,344 B1 | 1/2009 | McDermott | |
| 2001/0005561 A1 | 6/2001 | Yamada et al. | |
| 2001/0051297 A1* | 12/2001 | Nemoto | H01M 2/1241 |
| | | | 429/129 |
| 2002/0071987 A1 | 6/2002 | Kezuka | |
| 2002/0197536 A1 | 12/2002 | Mori et al. | |
| 2003/0071523 A1 | 4/2003 | Silverman | |
| 2003/0094923 A1 | 5/2003 | Emori | |
| 2003/0134189 A1 | 7/2003 | Kanai et al. | |
| 2005/0275372 A1 | 12/2005 | Crowell | |
| 2006/0012337 A1 | 1/2006 | Hidaka | |
| 2006/0082959 A1 | 4/2006 | DeLuga | |
| 2006/0105235 A1* | 5/2006 | Notten | H01M 2/0275 |
| | | | 429/176 |
| 2006/0154145 A1 | 7/2006 | Lee | |
| 2006/0210869 A1 | 9/2006 | Takeguchi et al. | |
| 2006/0215334 A1* | 9/2006 | Hong | H01M 2/0426 |
| | | | 361/15 |
| 2007/0002559 A1 | 1/2007 | Uke | |
| 2007/0186371 A1 | 8/2007 | Moore et al. | |
| 2008/0008933 A1 | 1/2008 | Lampre-Onnerud | |
| 2008/0090139 A1 | 7/2008 | Hurst | |
| 2009/0010804 A1 | 1/2009 | Withrow | |
| 2009/0042096 A1 | 2/2009 | McDermott | |
| 2009/0087729 A1 | 4/2009 | Johnson | |
| 2009/0134841 A1 | 5/2009 | Gilmore et al. | |
| 2009/0251100 A1 | 10/2009 | Incledon | |
| 2010/0136396 A1 | 6/2010 | Hermann | |
| 2011/0027662 A1* | 2/2011 | Nishimura | H01M 10/0525 |
| | | | 429/323 |
| 2011/0129711 A1* | 6/2011 | Ahn | H01M 2/30 |
| | | | 429/94 |
| 2011/0183183 A1 | 7/2011 | Grady | |
| 2012/0015223 A1 | 1/2012 | Bhardwaj et al. | |
| 2012/0015236 A1 | 1/2012 | Spare | |
| 2012/0056586 A1 | 3/2012 | Sim | |
| 2012/0125447 A1* | 5/2012 | Fuhr | H01M 2/0262 |
| | | | 137/260 |
| 2013/0293198 A1 | 11/2013 | Nakashima | |
| 2014/0099525 A1* | 4/2014 | Kwon | H01M 10/04 |
| | | | 429/94 |
| 2014/0211921 A1* | 7/2014 | Bandis | H01M 2/1094 |
| | | | 378/91 |
| 2015/0280185 A1* | 10/2015 | Lampe-Onnerud | |
| | | | H01M 2/1077 |
| | | | 429/9 |
| 2017/0250385 A1 | 8/2017 | Bhardwaj et al. | |

FOREIGN PATENT DOCUMENTS

| | | |
|---|---|---|
| CN | 202634499 | 12/2012 |
| CN | 104054204 | 9/2014 |
| DE | 202007003807 | 6/2007 |
| EP | 1315227 | 5/2003 |
| JP | S58-53162 | 3/1983 |
| JP | H06-21287 | 3/1994 |
| JP | H08-115741 | 5/1996 |
| JP | H11-144764 | 5/1999 |
| JP | 2001-527273 | 12/2001 |
| JP | 2002-084075 | 3/2002 |
| JP | 2002-245974 | 8/2002 |
| JP | 2002-325375 | 11/2002 |
| JP | 2004-87146 | 3/2004 |
| JP | 3611765 | 10/2004 |
| JP | 2005-78837 | 3/2005 |
| JP | 2005-116237 | 4/2005 |
| JP | 2006-93118 | 4/2006 |
| KR | 10-2013-0038367 | 4/2013 |
| KR | 10-2015-0001801 | 1/2015 |
| TW | 447159 | 7/2001 |
| TW | 485649 | 5/2002 |
| TW | I257728 | 5/2002 |
| TW | M267638 | 6/2005 |
| TW | I277231 | 3/2007 |
| TW | I296863 | 5/2008 |
| TW | 201126794 | 8/2011 |
| WO | WO 2010/013839 | 2/2010 |
| WO | WO 2012/009423 | 1/2012 |
| WO | WO 2012/161099 | 11/2012 |
| WO | WO 2014/059348 | 4/2014 |

* cited by examiner

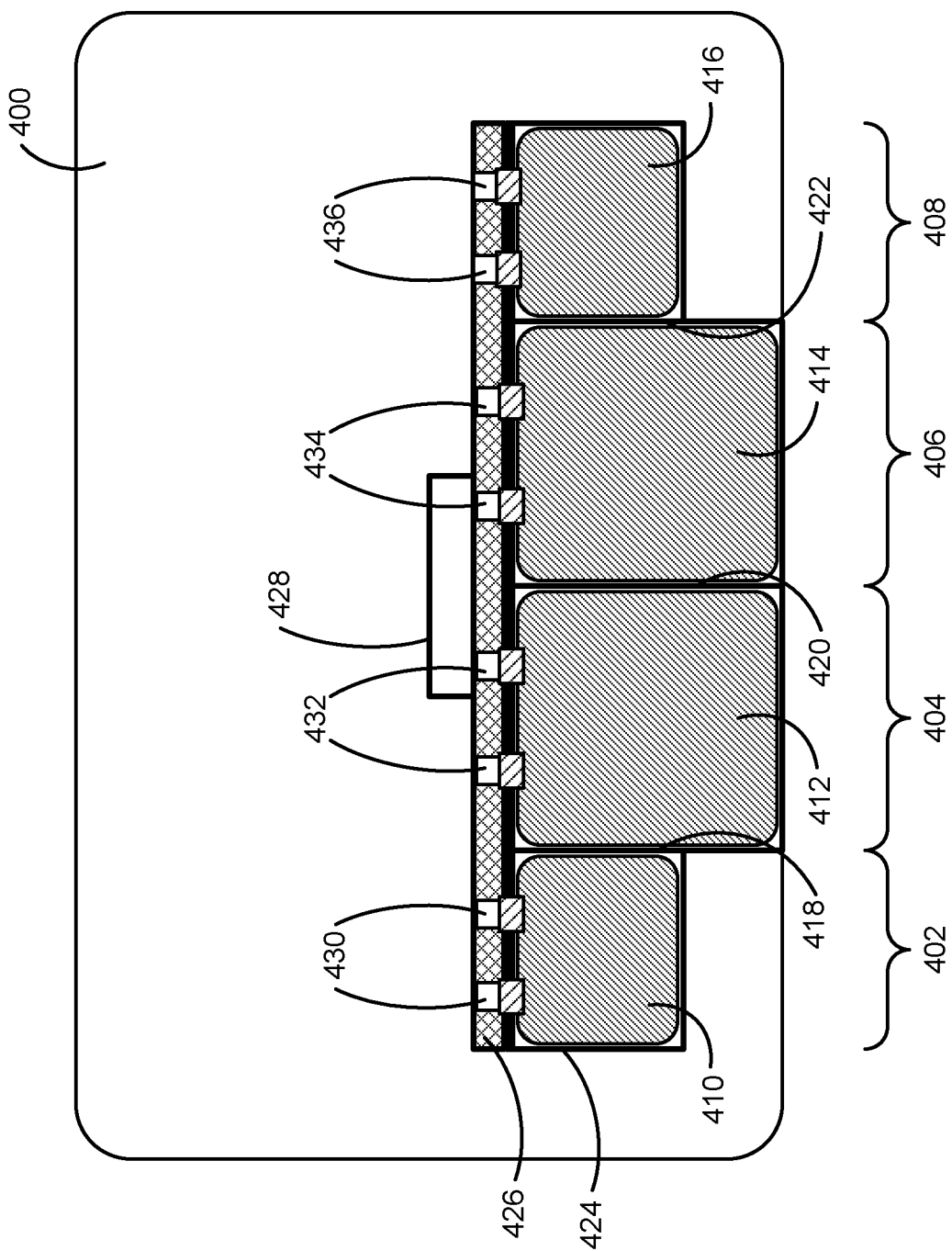

PACKAGING OF BARE CELL STACKS WITHIN DEVICE ENCLOSURES FOR PORTABLE ELECTRONIC DEVICES

PRIORITY

This application claims the benefit under 35 U.S.C. § 119(e) to U.S. Provisional Application No. 62/161,817 entitled "Packaging of Bare Cell Stacks within Device Enclosures for Portable Electronic Devices," filed on May 14, 2015, which is incorporated by reference in its entirety herein.

FIELD

The disclosure relates to batteries for portable electronic devices. More specifically, the disclosure relates to manufacturing bare cell stacks within device enclosures, and techniques for packaging the same.

BACKGROUND

Rechargeable batteries can be used to provide power to a wide variety of portable electronic devices, including laptop computers, tablet computers, mobile phones, personal digital assistants (PDAs), digital music players, and cordless power tools. A commonly used type of rechargeable battery is a lithium battery, which can include a lithium-ion or a lithium-polymer battery.

Lithium-polymer batteries can include cells that are packaged in flexible pouches. Such pouches are typically lightweight and inexpensive to manufacture. Moreover, these pouches may be tailored to various cell dimensions, allowing lithium-polymer batteries to be used in space-constrained portable electronic devices such as mobile phones, laptop computers, and/or digital cameras. For example, a lithium-polymer battery cell may achieve a packaging efficiency of 90-95% by enclosing rolled electrodes and electrolyte in an aluminized laminated pouch. Multiple pouches may then be placed side-by-side within a portable electronic device and electrically coupled in series and/or in parallel to form a battery for the portable electronic device.

In various embodiments, this type of battery pack design does not utilize free space in the portable electronic device that is outside of a rectangular space reserved for the battery pack. For example, a rectangular battery pack of this type may be unable to efficiently utilize free space that is curved, rounded, and/or irregularly shaped.

Hence, the use of portable electronic devices may be facilitated by improvements related to the packaging efficiency, capacity, form factor, design, and/or manufacturing of battery packs containing lithium-ion battery cells.

SUMMARY

The disclosure relates to battery packs, and the design and manufacture thereof. The battery pack includes a battery enclosure having a cell compartment and a sealing mechanism bonded to the cell compartment. The cell compartment can be formed within a device enclosure of a portable electronic device, with the bare cell stacks disposed therein. The sealing mechanism is bonded to the cell compartment to enclose the bare cell stack and electrolyte within the cell compartment.

In some aspects, the bare cell stack is non-rectangular or asymmetric.

In some aspects, the sealing mechanism includes a flexible sheet.

In some aspects, the flexible sheet includes a layer of aluminum and a layer of polypropylene.

In some aspects, the battery enclosure includes an electrolyte resistant layer.

In some aspects, the cell compartment includes a layer of aluminum formed by the device enclosure.

In some aspects, the cell compartment is formed to accommodate a non-rectangular or irregular shape of the bare cell stacks.

In some aspects, the bare cell stacks include:
a set of layers comprising a cathode with an active coating, a separator, and an anode with an active coating;
a first conductive tab coupled to the cathode; and
a second conductive tab coupled to the anode.

In some aspects, the first and second conductive tabs extend through the seal along the periphery of the opening in the cell compartment to provide terminals for the battery pack.

In some aspects, the cell compartment is formed within the device enclosure.

In some aspects, the disclosure is directed to a method for manufacturing a battery pack. The method includes obtaining a device enclosure for a portable electronic device. A cell compartment is at least partially formed by the device enclosure a bare cell stack. The bare cell stack in the cell compartment, and a sealing mechanism is bonded to the cell compartment to seal the bare cell stack and an electrolyte within the cell compartment and form a battery enclosure.

In some aspects, the sealing mechanism can include as flexible sheet. The battery enclosure can include seal between the cell compartment and sealing mechanism. In various non-limiting embodiments, the seal can be selected from a heat seal, a laser seal, tape, a curable glue, and a weld. In further aspects, the cell compartment can be lined with an electrolyte resistant layer prior to placing the bare cell stack in the cell compartment.

In further aspects, the bare cell stack can be separated from other cell stacks within the cell compartment by an internal divider. The cell compartment can include at least a portion of the bottom case of the device enclosure.

The disclosure is further directed to a portable electronic device that includes a battery pack as described herein.

BRIEF DESCRIPTION OF THE FIGURES

The disclosure will be readily understood by the following detailed description in conjunction with the accompanying drawings, wherein like reference numerals designate like structural elements, and in which:

FIG. 4A shows an arrangement of a set of bare cell stacks within a device enclosure of a portable electronic device in accordance with the disclosed embodiments.

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Efficient use of space in conventional battery pack architectures can be limited by the use and arrangement of cells. Conventional battery packs typically contain rectangular cells of the same capacity, size, and dimensions. The physical arrangement of the cells may additionally mirror the electrical configuration of the cells. For example, a six-cell battery pack may include six lithium-polymer cells of the same size and capacity configured in a two in series, three in parallel (2s3p) configuration. Within such a battery pack, two rows of three cells placed side-by-side may be stacked on top of each other. Each row may be electrically coupled in a parallel configuration, or the two rows electrically coupled in a series configuration. Consequently, the battery pack may require space in a portable electronic device that is at least the length of each cell, twice the thickness of each cell, and three times the width of each cell.

The disclosure provides a battery pack in which the cell compartment is formed within the device enclosure. In some variations, the cell compartment is a metal, such as aluminum or an aluminum alloy. Non-corrosive coatings can line the interior of the cell compartment. In various aspects, assembled bare cell stacks placed in the cell compartments are covered with a sealing mechanism bonded to the cell compartment to form a seal between the cell compartment and sealing mechanism. For example, the seal can be formed using heat under a certain pressure, or by external sources such as curable glues, welding, etc. Electrolyte can be injected before or after final sealing.

As referred to herein, bare cell stacks can refer to a non-active dry cell stack before or during battery assembly, or an active battery. In some embodiments, the bare cell stack is a non-active dry cell stack during manufacture of the battery pack until a charge is applied.

The bare cell stacks can have a non-rectangular or irregular shape, as described herein. Because the cell compartment is formed within and includes device enclosure, the battery pack may not need precise alignment because bare cell stacks are embedded into the cell compartment.

Figure 1:
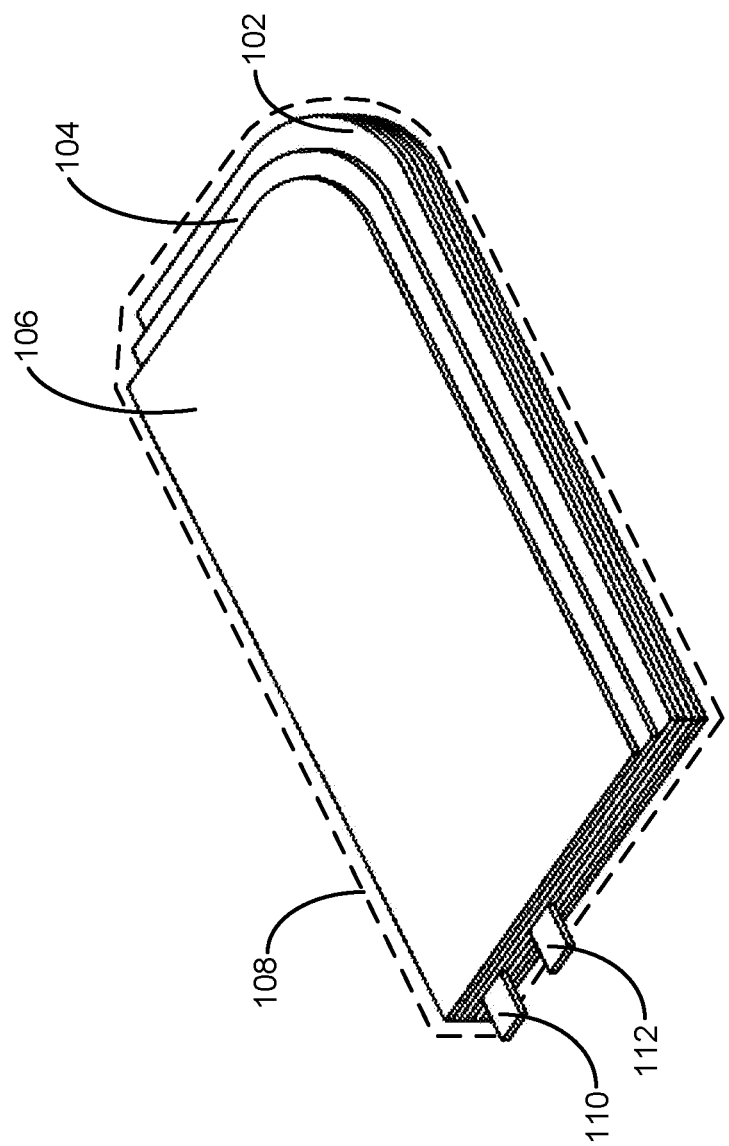
FIG. 1 shows a bare cell stack in accordance with the disclosed embodiments.

FIG. 1 shows a bare cell stack in accordance with the disclosed embodiments. The bare cell stack may correspond to a lithium-ion cell that supplies power to a portable electronic device such as a laptop computer, mobile phone, tablet computer, personal digital assistant (PDA), portable media player, digital camera, and/or other type of battery-powered electronic device after completion of proper activation process.

As shown in FIG. 1, the bare cell stack includes layers 102, 104, and 106 (also referred to as layers 102-106) that form a non-rectangular, terraced structure with a rounded corner. Layers 102-106 may include a cathode with an active coating, a separator, and an anode with an active coating. For example, each set of layers 102-106 may include one strip of cathode material (e.g., aluminum foil coated with a lithium compound) and one strip of anode material (e.g., copper foil coated with carbon) separated by one strip of separator material (e.g., conducting polymer electrolyte).

To form the non-rectangular shape, layers 102-106 may be cut from sheets of cathode, anode, and/or separator material. For example, layers 102-106 may be formed by cutting substantially rectangular shapes with rounded upper right corners from the sheets of material. Moreover, the sheets of material may be cut so that layers 102-106 have the same shape but the bottommost layers 102 are the largest, the middle layers 104 are smaller, and the topmost layers 106 are the smallest.

Layers 102-106 may then be arranged to form the non-rectangular shape. For example, layers 102-106 may be heat-pressed or glued to form a stacked cell stack, or wound on a mandrel to form a spirally wound structure such as a jelly roll. Alternatively, layers 102-106 may be formed into sub-cells of different sizes that are stacked to create the non-rectangular shape. Each sub-cell may be a mono-cell containing an anode layer, a cathode layer, and one or more separator layers; a bi-cell containing multiple anode and/or cathode layers with layers of separator sandwiched between the anode and cathode layers; and/or a half-cell containing a separator layer and either an anode or a cathode layer.

After layers 102-106 are formed into the non-rectangular shape, layers 102-106 may be enclosed in a pouch 108, and a set of conductive tabs 110-112 may be extended through seals in the pouch (for example, formed using sealing tape) to provide terminals for the bare cell stack. Conductive tabs 110-112 may be used to electrically couple the bare cell stack with other bare cell stacks to form a battery pack. For example, conductive tab 110 may be coupled to the cathodes of layers 102-106, and conductive tab 112 may be coupled to the anodes of layers 102-106. Conductive tabs 110-112 may further be coupled to other bare cell stacks in a series, parallel, or series-and-parallel configuration to form the battery pack. The coupled cells may be enclosed in a hard case to complete the battery pack, or the coupled cells may be embedded within the enclosure of the portable electronic device.

To enclose the bare cell stack in pouch 108, layers 102-106 may be placed on top of a flexible sheet made of aluminum with a polymer film, such as polypropylene. Another flexible sheet may then be placed over the tops of layers 102-106, and the two sheets may be heat-sealed and/or folded. Alternatively, layers 102-106 may be placed in between two sheets of pouch material that are sealed and/or folded on some (e.g., non-terminal) sides. The remaining sides may then be heat-sealed and/or folded to enclose layers 102-106 within pouch 108.

In various embodiments, the bare cell stack of FIG. 1 facilitates efficient use of space within the portable electronic device. For example, the terraced and/or rounded edges of the bare cell stack may allow the bare cell stack to fit within a curved enclosure for the portable electronic device. The number of layers (e.g., layers 102-106) may also be increased or decreased to better fit the curvature of the portable electronic device's enclosure. In other words, the bare cell stack may include an asymmetric and/or non-rectangular design that accommodates the shape of the portable electronic device. In turn, the bare cell stack may provide greater capacity, packaging efficiency, and/or voltage than rectangular battery cells in the same portable electronic device.

Figure 2:
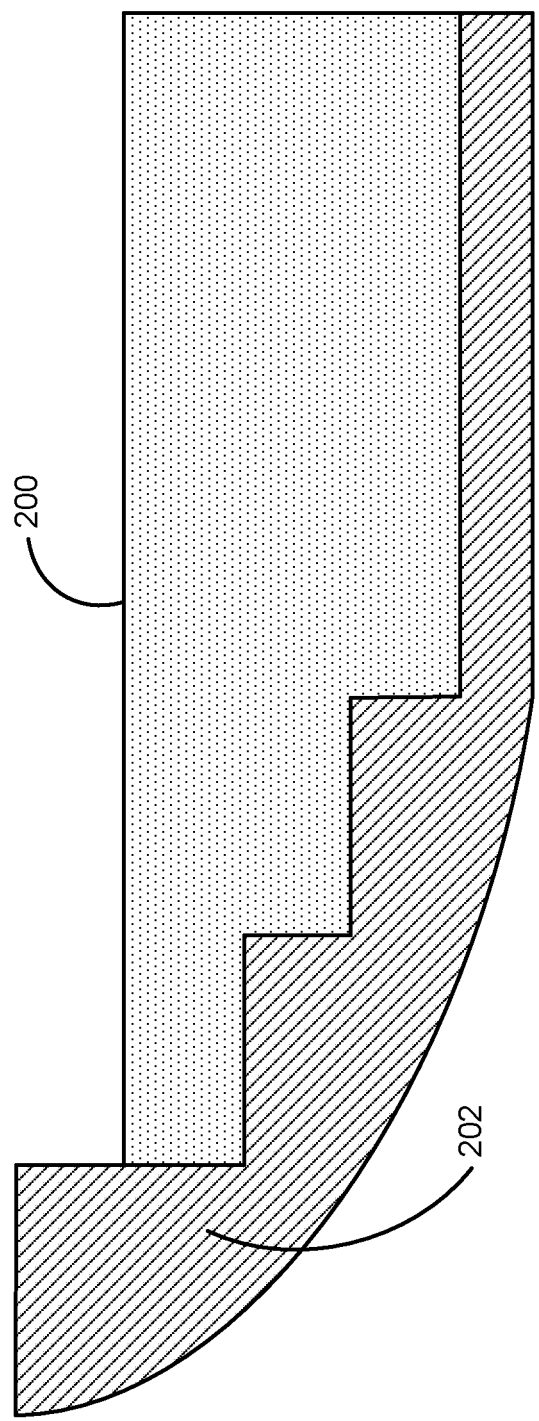
FIG. 2 shows a cross-sectional view of the placement of a bare cell stack within a device enclosure for a portable electronic device in accordance with the disclosed embodiments.

As shown in FIG. 2, a non-rectangular battery cell 200 (e.g., the bare cell stack of FIG. 1) may be placed into a device enclosure 202 of the portable electronic device by aligning the dimensions of battery cell 200 with the dimensions of device enclosure 202. For example, the terraced structure of battery cell 200 may be aligned along dimensions with a series of steps along a bottom case of device enclosure 202. In other words, the device enclosure 202 may be formed in a way that accommodates the non-rectangular shape of battery cell 200.

During assembly of a battery pack containing battery cell 200, bare cell stacks (e.g., the bare cell stack of FIG. 1) may be enclosed in a flexible pouch to form battery cell 200, and conductive tabs may be extended through seals in the pouch to provide terminals for the battery pack. Next, a fixture may be used to align battery cell 200 with other battery cells along three dimensions, and the battery pack may be formed by using one or more busbars to electrically couple the battery cells with one another and a battery-management unit (BMU). For example, the conductive tabs of the battery cells may be welded to the busbars, and the busbars may be connected to the BMU to complete assembly of the battery pack.

The battery pack may then be installed in device enclosure 202 by measuring the three-dimensional (3D) layout of device enclosure 202 and using the 3D layout to place the battery pack in the appropriate location within device enclosure 202. If alignment of battery cell 200 within the battery pack and/or the battery pack in device enclosure 202 is imprecise, the layers of battery cell 200 may be damaged. For example, the corners and/or edges of the terraced structure of the bare cell stack in battery cell 200 may be crushed and/or deformed if the terraced structure is not correctly aligned with the steps along the bottom case of device enclosure 202 during placement of battery cell 200 in device enclosure 202. Similarly, inadequate clearance between the bare cell stack and an adjacent bare cell stack in the battery pack may result in damage to one or both bare cell stacks during assembly of the battery pack and/or installation of the battery pack in device enclosure 202.

Figure 3:
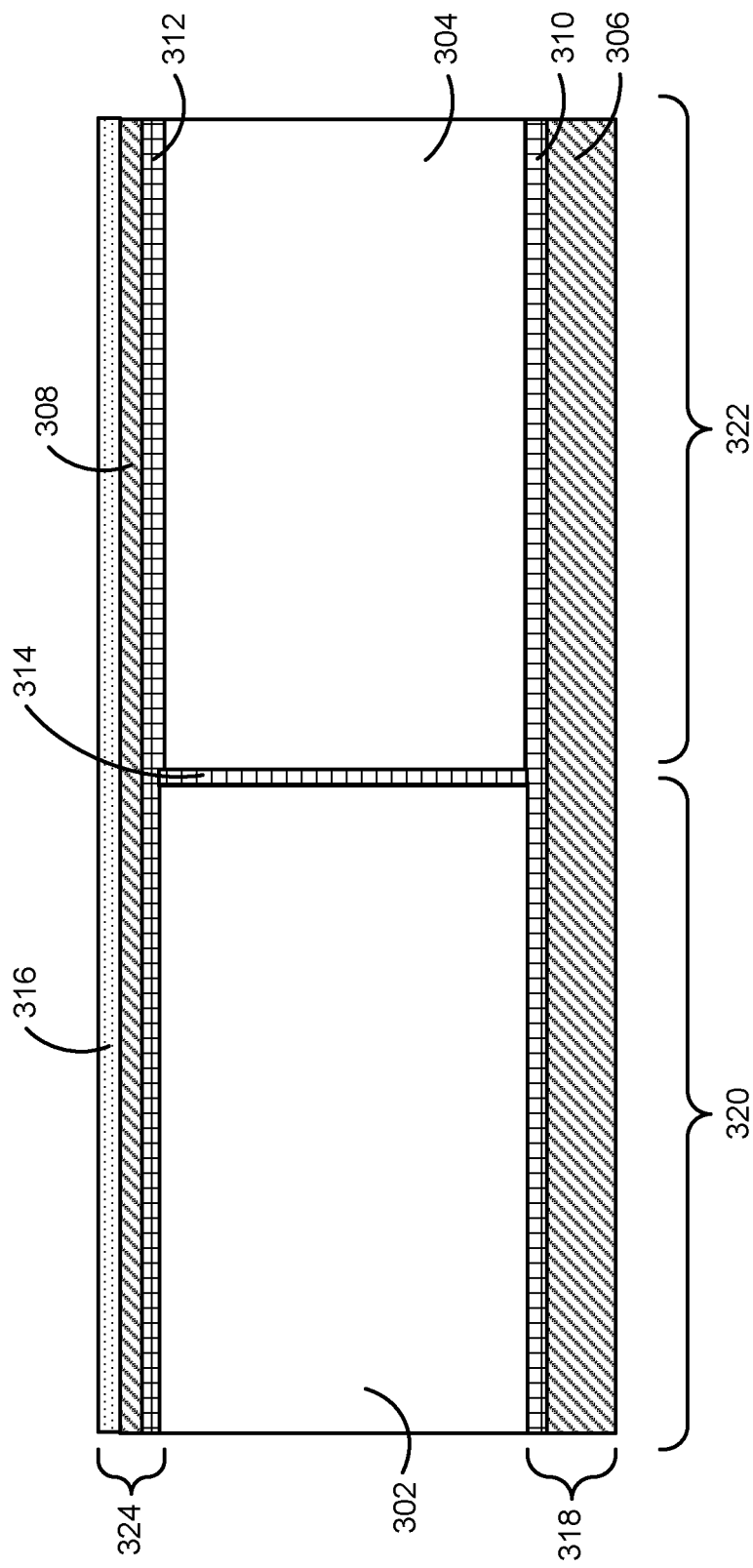
FIG. 3 shows a cross-sectional view of a battery pack in accordance with the disclosed embodiments.

In various embodiments, assembly of bare cell stacks into battery packs and/or portable electronic devices can be simplified by placing the bare cell stacks directly within cell compartments within device enclosure 202 and using the cell compartments as a part of the battery packs. The bare cell stacks can be irregular and/or non-rectangular, as described herein. As shown in FIG. 3, a battery pack may include bare cell stacks 302, 304 that are placed directly cell compartments 320, 322 respectively. Cell compartments 320 and 322 can be disposed in, or partially formed by, bottom case 318 of a device enclosure, such as device enclosure 202 of FIG. 2. Cell compartments 320, 322 may include steps, contours, and/or other irregular and/or non-rectangular shapes that accommodate the non-rectangular shape of bare cell stacks 302, 304. More specifically, each bare cell stack 302, 304 may be placed within a corresponding cell compartment 320, 322 that is partially formed by bottom case 318 to accommodate the contours, terraces, and/or dimensions of the bare cell stack. In addition, wound and/or stacked layers of cathode, anode, and separator of bare cell stacks 302, 304 may be inserted directly into cell compartments 320, 322 instead of packaging bare cell stacks 302, 304 in flexible pouches. Because the layers of bare cell stacks 302, 304 are not obscured, alignment of bare cell stacks 302, 304 with cell compartments 320, 322 in bottom case 318 may be simplified, and damage to bare cell stacks 302, 304 during assembly and/or installation of the battery pack may be reduced.

In various aspects, cell compartments may also include an electrolyte resistant layer. For example, cell compartments 320, 322 may include a layer of aluminum 306, and a electrolyte resistant layer 310 (e.g., polypropylene) disposed over the layer of aluminum 306. For example, cell compartments 320, 322 partially formed by bottom case 318 may include a layer of aluminum 306 that provides structural protection to bare cell stacks 302, 304 and/or other components in a portable electronic device. An electrolyte resistant layer 310 (e.g. a polypropylene coating) may be applied to the layer of aluminum 306, for example using an injection-molding technique to protect against corrosion from lithium-ion electrolyte in the battery pack. In various embodiments, the electrolyte resistant layer can have a thickness of 30-55 microns.

Those skilled in the art will appreciate that various coating techniques, electrolyte-resistant (e.g., polyolefinic) materials, and/or layers may be used to form cell compartments. In particular, cell compartments 320, 322 may include materials and/or layers that structurally support bare cell stacks 302, 304 and seal bare cell stacks 302, 304 and electrolyte within cell compartments 320, 322. For example, the rigidity of cell compartments 320, 322 may be provided by a layer of plastic. A layer of aluminum and/or other metal may be deposited over the layer of plastic using an adhesive, deposition technique, and/or other coating technique to prevent water vapor and/or gas permeation between the battery pack and the outside of the portable electronic device. An electrolyte resistant layer 310 may then be deposited over the layer of aluminum to protect the plastic and/or aluminum layers from corroding and/or reacting with electrolyte. In another example, a layer of glass may be substituted for a rigid layer of aluminum 306 in cell compartments 320, 322, and electrolyte resistant layer 310 may be coated directly on the glass.

Within cell compartments 320, 322, bare cell stacks 302, 304 may be internally separated from one another by an internal divider 314. In various aspects, internal dividers may form part of the cell compartments. Internal divider 314 may be formed from one or more materials such as polypropylene, polyethylene that physically separates bare cell stacks 302, 304. For example, internal divider 314 may include a ridge (e.g., polypropylene) that separates cell compartments 320, 322. In some embodiments, the ridge may be created during coating of aluminum 306 in cell compartments 320, 322 with electrolyte resistant layer 310 (e.g., using an injection-molding technique). Cell compartments 320, 322 that are at least partially defined by the ridge may then be separately filled with bare cell stacks 302, 304 and electrolyte to allow series connections between bare cell stacks 302, 304, producing voltage increases in the battery pack.

To seal bare cell stacks 302, 304 and electrolyte within respective cell compartments 320, 322, one or more sealing mechanisms, such as flexible sheet 324, may be disposed over bare cell stacks 302, 304 in cell compartments 320, 322. A seal may be formed between flexible sheet 324 and the periphery of the openings of cell compartments 320, 322. Like bottom case 318, flexible sheet 324 may include an electrolyte resistant layer 312 (e.g., polypropylene) that provides corrosion resistance, and a layer of aluminum 308 that prevents gas and liquid from entering or leaving the sealed bare cell stacks 302, 304. Flexible sheet 324 may additionally include a layer of nylon 316 disposed over the layer of aluminum 308 to improve the puncture resistance of the battery pack.

Sealing mechanisms, such as flexible sheet 324, may utilize a number of materials and/or layers to provide corrosion resistance, moisture resistance, hermeticity, and/or puncture resistance to the battery pack. For example, another metal may be used in lieu of aluminum 308 to provide a gas and/or moisture barrier in flexible sheet 324. Along the same lines, polyether ether ketone (PEEK) may be substituted for nylon 316 to impart puncture resistance to flexible sheet 324.

Once flexible sheet 324 is placed over bare cell stacks 302, 304, a seal may be formed between flexible sheet 324 and the periphery of the openings in cell compartments 320, 322 by applying heat to one or more points of contact between flexible sheet 324 and cell compartments 320, 322. The heat may melt the electrolyte resistant layers 310-312 on flexible sheet 324 and cell compartments 320, 322, causing the layers to flow together and form an enclosure around bare cell stacks 302, 304. Sealing of bare cell stacks within cell compartments is described in further detail below with respect to FIG. 4B.

FIG. 4A shows an example of an arrangement of a set of bare cell stacks 410, 412, 414, and 416 (also referred to as bare cell stacks 410-416) within a device enclosure 400 for a portable electronic device, in accordance with the disclosed embodiments. Bare cell stacks 410-416 may be placed directly within cell compartments 402-408 that are formed within device enclosure 400. For example, wound or stacked layers of cathode, anode, and separator in non-rectangular bare cell stacks 410-416 may be placed in cell compartments 402-408 formed in a bottom case for the portable electronic device so that steps, terraces, and/or contours in bare cell stacks 410-416 are aligned with the corresponding steps, terraces, and/or contours in cell compartments 402-408. As discussed above, cell compartments 402-408 may include a rigid layer of aluminum, another metal, and/or glass, as well as an electrolyte resistant layer (e.g., polypropylene) that is disposed on top of the rigid layer. The electrolyte resistant layer may extend to a periphery 424 of openings in cell compartments 402-408 in device enclosure 400.

In addition, bare cell stacks 410-416 may be placed in cell compartments 402-408, respectively, so that respective conductive tabs 430-436 of bare cell stacks 410-416 extend past the periphery of cell compartments 402-408 onto busbars 426. Conductive tabs 430-436 may then be welded to busbars 426 to electrically couple bare cell stacks 410-416 to one another and/or to a BMU 428.

Cell compartments 402-408 may include a number of internal dividers 418-422 that internally separate bare cell stacks 410-416 from one another. Internal dividers 418-422 may include an electrolyte resistant layer formed of a material polypropylene, polyethylene, and/or another polyolefinic material that is resistant to corrosion from electrolyte used by bare cell stacks 410-416. As discussed in further detail below with respect to FIG. 4B, seals may be bonded to cell compartments 402-408 along internal dividers 418-422 and periphery 424 to seal bare cell stacks 410-416 and electrolyte within cell compartments 402-408 and form a battery pack for the portable electronic device. It will be recognized that in various aspects, internal dividers may form part of the cell compartments.

Figure 4B:
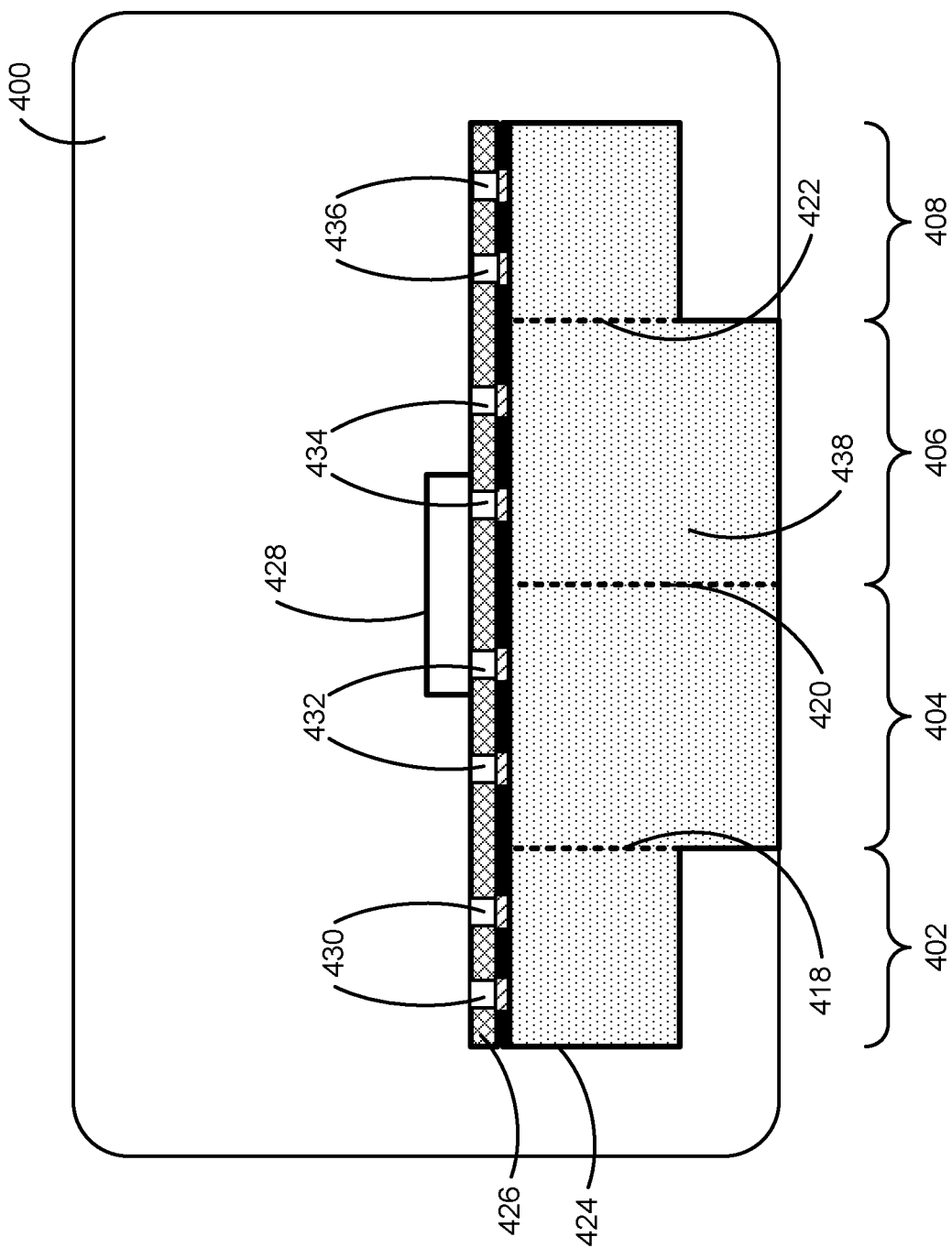
FIG. 4B shows sealing of a set of bare cell stacks within a device enclosure for a portable electronic device in accordance with the disclosed embodiments.

FIG. 4B shows an example of sealing a set of bare cell stacks (e.g., bare cell stacks 410-416 of FIG. 4A) within device enclosure 400 for a portable electronic device in accordance with the disclosed embodiments. As shown in FIG. 4B, an electrolyte resistant layer such as flexible sheet 438 may be used to seal the bare cell stacks within cell compartments 402-408 and form a battery pack for the portable electronic device. Flexible sheet 438 may include a layer of electrolyte resistant material (e.g. polypropylene), a layer of aluminum, and/or a layer of nylon.

During sealing of the bare cell stacks in cell compartments 402-408, flexible sheet 438 may be placed over cell compartments 402-408, and heat and/or pressure may be applied to edges along periphery 424 of cell compartments 402-408 and/or internal dividers 418-422 to melt the polypropylene layers in flexible sheet 438, periphery 424, and/or internal dividers 418-422. The melted polypropylene may flow together and laminate flexible sheet 438 to periphery 424 and/or internal dividers 418-422, thus forming a hermetic enclosure around the bare cell stacks. Alternatively, seals along periphery 424 and/or internal dividers 418-422 may be formed using a laser-sealing technique, tape, a curable glue, and/or a welding technique.

In various embodiments, a seal between flexible sheet 438 and cell compartments 402-408 initially can be formed along a subset of the edges in periphery 424 and internal dividers 418-422, and electrolyte is injected into cell compartments 402-408 through remaining openings between flexible sheet 438, and cell compartments 402-408. For example, heat seals may be formed along internal dividers 418-422 and the sides and bottom of periphery 424, and electrolyte may be injected through openings between the tops of cell compartments 402-408 (e.g., next to busbars 426) and flexible sheet 438. After electrolyte is added to the partially sealed cell compartments 402-408, additional seals along the remaining openings may be formed to seal the bare cell stacks and electrolyte in cell compartments 402-408. For example, seals along the top of periphery 424 may be formed such that flexible sheet 438 includes extra material that does not contact the cathode, anode, and separator layers of bare cell stacks in cell compartments 402-408.

Battery cells formed from the sealed bare cell stacks, cell compartments 402-408, and sealing mechanism such as flexible sheet 438 may be activated by performing a formation charge on the battery cells and degassing the battery cells. First, the formation charge may be performed by charging the battery cells at one or more charge rates until the voltage of the battery cells reaches a pre-specified amount. Next, the battery cells may be degassed to release gas generated by the battery cells during the formation charge. To degas the battery cells, punctures may be made in the portion of flexible sheet 438 that does not contact the layers of bare cell stacks in cell compartments 402-408, and a vacuum may be used to remove the gas in cell compartments 402-408. Flexible sheet 438 may then be resealed along a line that is closer to the layers than the punctured portion, and the extra material associated with the punctured portion is removed.

For example, the bare cell stacks may initially be sealed in cell compartments 402-408 so that two folds of extra material in flexible sheet 438 extend beyond the top of periphery 424. After the formation charge is applied, punctures may be made in the folds of extra material to degas the battery cells, and the bare cell stacks may be resealed along the top of periphery 424 so that the punctured material is outside the sealed periphery 424. Material that is outside the sealed periphery 424 is then removed to complete both assembly and installation of the battery pack in device enclosure 400.

Resealing of the bare cell stacks may additionally be performed so that flexible sheet 438 within the sealed periphery 424 has enough additional material to accommodate battery subsequent swelling and/or gas buildup of the battery cells during use of the battery pack with the portable electronic device. The additional material may provide a buffer that allows the battery cells and/or gas to expand upward (e.g., away from the inflexible bottom case of device enclosure 400) without stressing the seals along periphery 424 and/or internal dividers 418-422.

Figure 5:
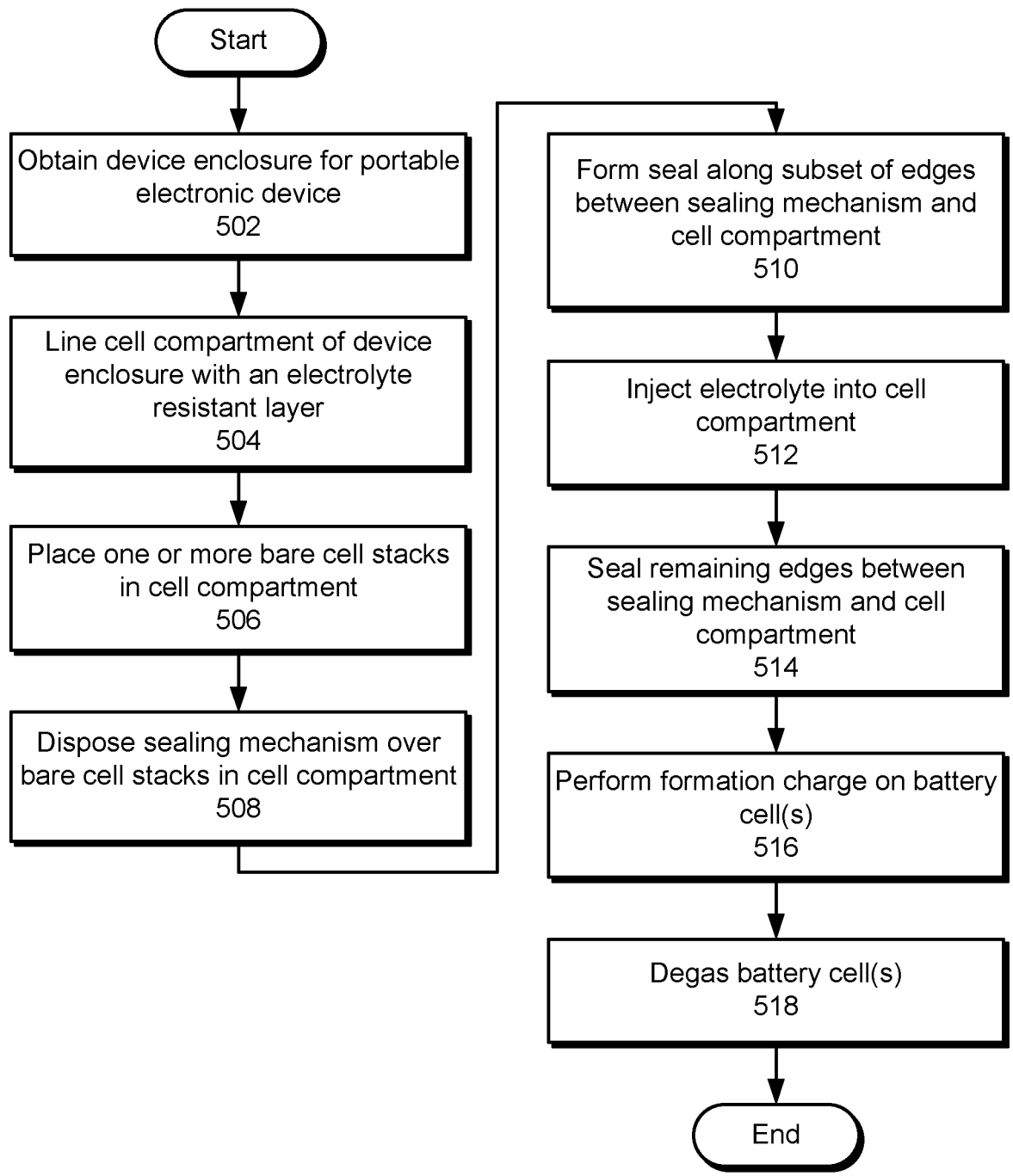
FIG. 5 shows a flowchart illustrating a process of manufacturing a battery pack in accordance with the disclosed embodiments.

FIG. 5 shows a flowchart illustrating the process of manufacturing a battery pack in accordance with the disclosed embodiments. In various embodiments, one or more of the operations may be omitted, repeated, and/or performed in a different order. Accordingly, the specific arrangement of operations shown in FIG. 5 should not be construed as limiting the scope of the embodiments.

Initially, a device enclosure for a portable electronic device is obtained (operation 502). The device enclosure may include a cell compartment for holding bare cell stacks in the portable electronic device. The cell compartment may be formed to accommodate a non-rectangular or irregular shape of the bare cell stacks, or have bare cell stacks with components having different dimensions. For example, the cell compartment may include terraces, steps, and/or contours that support the terraces, steps, and/or contours of the bare cell stacks.

Next, the cell compartment can be lined with an electrolyte resistant layer (e.g., polypropylene) (operation 504). For example, an injection-molding technique and/or other coating technique may be used to apply a 30-55 micron coating of an electrolyte resistant layer to the cell compartment.

The bare cell stacks are placed in the cell compartment (operation 506). For example, stacked and/or wound layers of cathode, anode, and separator for the bare cell stacks may be placed in the cell compartment so that the non-rectangular shape of the bare cell stacks is aligned with the bottom of the cell compartment. The bare cell stacks may also be positioned in the cell compartment so that the bare cell stacks can be internally separated within the cell compartment by internal dividers made of polypropylene and/or polyethylene.

A sealing mechanism (e.g., a flexible sheet) is also disposed over the bare cell stacks in the cell compartment (operation 508). In some embodiments, the sealing mechanism may include a layer of aluminum and an electrolyte resistant layer (e.g, a layer of polypropylene). A seal is then formed along a subset of the edges between the sealing mechanism and the periphery of the opening in the cell compartment (operation 510) to form battery cells in the battery pack. For example, seals may be formed along the top, sides, bottom, and/or internal dividers of the cell compartment using a heat-sealing technique, a laser-sealing technique, tape, a curable glue, and/or a welding technique.

Electrolyte is injected into the cell compartment (operation 512) through remaining openings between the cell compartment and the sealing mechanism, and the openings are closed by sealing the remaining edges between the sealing mechanism and the periphery of the opening in the cell compartment (operation 514). For example, the electrolyte may be injected through openings along unsealed edges of the periphery of the cell compartment, and the edges may be sealed so that the sealing mechanism includes extra material that does not contact the bare cell stacks in the cell compartment.

A formation charge is then performed on the battery cells (operation 516), and the battery cell is degassed (operation 518). The formation charge may be performed at one or more charge rates until the voltage of the battery cells reaches a pre-specified amount. The battery cells may then be degassed by puncturing a portion of the sealing mechanism that does not contact the bare cell stacks and releasing gas generated during the formation charge through the punctured portion. The sealing mechanism may then be resealed to the cell compartment along a line that is closer to the layers than the punctured portion. Finally, the punctured portion may be removed from the sealing mechanism.

Figure 6:
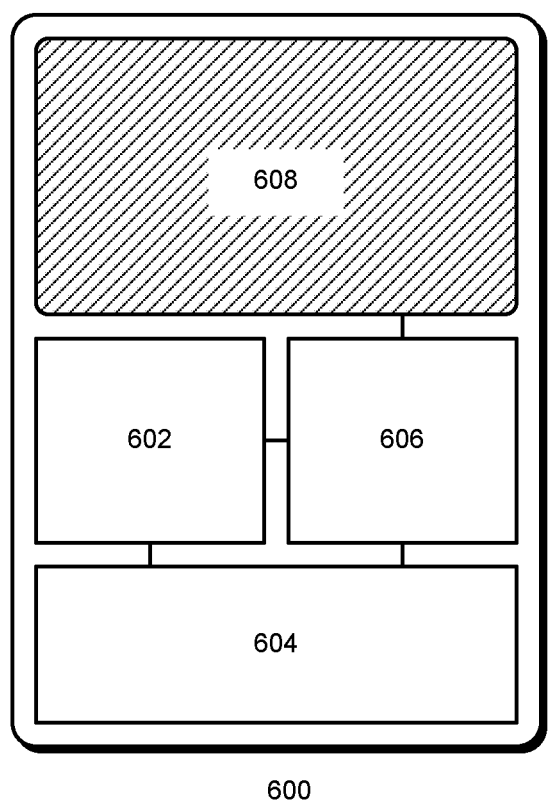
FIG. 6 shows a portable electronic device in accordance with the disclosed embodiments.

The above-described rechargeable battery cell can generally be used in any type of electronic device. For example, FIG. 6 illustrates a portable electronic device 600 which includes a processor 602, a memory 604, and a display 608, which are all powered by a battery 606. Portable electronic device 600 may be a laptop computer, tablet computer, mobile phone, PDA, portable media player, digital camera, and/or other type of battery-powered electronic device. Battery 606 may correspond to a battery pack that includes bare cell stacks. A battery enclosure of the battery pack may include a cell compartment formed within a device enclosure for the portable electronic device. A sealing mechanism may be used to seal the bare cell stacks and electrolyte for the battery cells within the cell compartment. The sealing mechanism may include a seal that is bonded to the cell compartment along a periphery of an opening in the cell compartment.

The battery packs, components thereof, and various non-limiting components and embodiments as described herein can be used with various electronic devices. Such electronic devices can be any electronic devices known in the art. For example, the device can be a telephone, such as a mobile phone, and a land-line phone, or any communication device, such as a smart phone, including, for example an iPhone®, and an electronic email sending/receiving device. The battery cans, battery assemblies, and various non-limiting components and embodiments as described herein can be used in conjunction with a display, such as a digital display, a TV monitor, an electronic-book reader, a portable web-browser (e.g., iPad®), watch (e.g., AppleWatch), or a computer monitor. The device can also be an entertainment device, including a portable DVD player, conventional DVD player, Blue-Ray disk player, video game console, music player, such as a portable music player (e.g., iPod®), etc. Devices include control devices, such as those that control the streaming of images, videos, sounds (e.g., Apple TV®), or a remote control for a separate electronic device. The device can be a part of a computer or its accessories, laptop keyboard, laptop track pad, desktop keyboard, mouse, and speaker.

The above-described methods and processes (e.g., the operations described with reference to FIG. 5) can be embodied as code and/or data, which can be stored in a computer-readable storage medium as described above. In some embodiments the code and/or data are tangibly embodied on a non-transitory computer-readable storage medium. When a computer system reads and executes the code and/or data stored on the computer-readable storage medium, the computer system performs the methods and processes as they are embodied as the respective code and/or data structures in the computer-readable storage medium.

Examples of computer-readable storage medium can include, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

Furthermore, methods and processes described herein can be included in hardware circuits or apparatus. These circuits or apparatus may include, but are not limited to, an application-specific integrated circuit (ASIC) chip, a field-programmable gate array (FPGA), a dedicated or shared processor that executes operations embodied in code and/or data structures, as well as other programmable-logic devices now known or later developed. When the hardware modules or apparatus are activated, they perform the methods and processes included within them.

While the present disclosure has been described with reference to various implementations and embodiments, it will be understood that these implementations are illustrative and are presented only for purposes of illustration and description. Many variations, modifications, additions, and improvements are possible. More generally, implementations in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A battery pack, comprising:
    a first and second bare cell stack and an electrolyte;
    a cell compartment formed at least partially within an electronic device, the cell compartment comprising at least one of a layer of aluminum, metal, and glass formed from the electronic device; the cell compartment having a polypropylene liner disposed therein, the polypropylene liner further disposed along a periphery of the cell compartment, the cell compartment further comprising an internal divider formed of polypropylene;
    wherein the first bare cell stack is separated from the second bare cell stack by the internal divider;
    wherein the first bare cell stack, second bare cell stack, and electrolyte are disposed within the cell compartment; and
    a sealing mechanism comprising a polypropylene sheet disposed over the cell compartment, wherein the polypropylene sheet, the internal divider, and the polypropylene liner disposed along the periphery of the cell compartment are integrally formed to hermetically seal the first bare cell stack, second bare cell stack, and the electrolyte within the cell compartment.

2. The battery pack of claim 1, wherein the first and second bare cell stack are non-rectangular or asymmetric.

3. The battery pack of claim 1, wherein the sealing mechanism comprises a flexible sheet.

4. The battery pack of claim 1, wherein the cell compartment accommodates a non-rectangular or asymmetric shape of the first and second bare cell stack.

5. The battery pack of claim 1, wherein the first and second bare cell stack each comprise:
    a set of layers comprising a cathode with an active coating, a separator, and an anode with an active coating;
    a first conductive tab coupled to the cathode; and
    a second conductive tab coupled to the anode,
    wherein the first and second conductive tabs extend through the cell compartment.

6. The battery pack of claim 1, wherein the cell compartment comprises at least a portion of a bottom case of the electronic device.

7. A method for manufacturing a battery pack, comprising:
    obtaining an electronic device, wherein the electronic device comprises a cell compartment configured to hold a first and second bare cell stack, the cell compartment comprising at least one of a layer of aluminum, metal, and glass formed from the electronic device; the cell compartment having a polypropylene liner disposed therein, the polypropylene liner further disposed along a periphery of the cell compartment, the cell compartment further comprising an internal divider formed of polypropylene;
    placing the first and second bare cell stack in the cell compartment, wherein the first bare cell stack is separated from the second bare cell stack by the internal divider;
    placing a polypropylene sheet over the cell compartment; and
    melting the polypropylene sheet, the internal divider, and the polypropylene liner disposed along the periphery of the cell compartment together to hermetically seal the first bare cell stack, second bare cell stack, and an electrolyte within the cell compartment.

8. The method of claim 7, wherein the polypropylene sheet comprises a flexible sheet.

9. The method of claim 7, wherein the cell compartment comprises at least a portion of a bottom case of the electronic device.

10. A portable electronic device, comprising:
    a set of components powered by a battery pack;
    the battery pack, comprising a first and second bare cell stack and an electrolyte;
    a cell compartment comprising at least one of a layer of aluminum, metal, and glass; the cell compartment having a polypropylene liner disposed therein, the polypropylene liner further disposed along a periphery of the cell compartment, the cell compartment further comprising an internal divider formed of polypropylene;
    wherein the first bare cell stack is separated from the second bare cell stack by the internal divider; and
    a sealing mechanism comprising a polypropylene sheet disposed over the cell compartment, wherein the polypropylene sheet, the internal divider, and the polypropylene liner disposed along the periphery of the cell compartment are integrally formed to hermetically seal the first bare cell stack, second bare cell stack, and the electrolyte within the cell compartment.

11. The portable electronic device of claim 10, wherein the sealing mechanism comprises a flexible sheet.

* * * * *